United States Patent [19]

Lavalley et al.

[11] 4,117,450
[45] Sep. 26, 1978

[54] DEVICE FOR AUTOMATIC SIGNALLING OF AN AUTOMOTIVE VEHICLE DAMAGED BY COLLISION

[75] Inventors: Roger Lavalley, Pantin; Roger Gozlan, Versailles; Gilbert Brami, Pantin, all of France

[73] Assignee: Serpo "Societe d'Etudes et de Recherches pour la protection, France

[21] Appl. No.: 680,664

[22] Filed: Apr. 27, 1976

Related U.S. Application Data

[62] Division of Ser. No. 407,445, Oct. 18, 1973.

[30] Foreign Application Priority Data

Feb. 23, 1973 [FR] France .................. 73.06554
Aug. 14, 1973 [FR] France .................. 73 29757

[51] Int. Cl.² .................. B60Q 9/00; G01P 15/02
[52] U.S. Cl. .................. 340/52 H; 200/61.45 R; 200/61.53; 340/61
[58] Field of Search .................. 340/52 H, 61, 72, 76, 340/81 R, 81 F, 224, 262; 200/61.45 R, 61.52, 61.53, 153 A; 180/103

[56] References Cited

U.S. PATENT DOCUMENTS

| | | | |
|---|---|---|---|
| 2,854,539 | 9/1958 | Ruppel | 200/61.45 R |
| 2,979,582 | 4/1961 | Weaver | 200/61.45 R |
| 3,410,359 | 11/1968 | Mollison | 180/103 |
| 3,550,717 | 12/1970 | Doty, Jr. | 180/103 |
| 3,626,764 | 12/1971 | Prachar | 73/492 |
| 3,628,384 | 12/1971 | Jones | 73/514 |
| 3,631,728 | 1/1972 | Prachar et al. | 73/492 |
| 3,641,491 | 2/1972 | Bath | 340/61 |
| 3,646,583 | 2/1972 | Scuderi | 340/52 H |
| 3,745,277 | 7/1973 | Shawcross et al. | 200/61.5 |

*Primary Examiner*—John W. Caldwell, Sr.
*Assistant Examiner*—Joseph E. Nowicki

[57] ABSTRACT

An inertial sensor device for automatically operating warning means in an automotive vehicle is provided which comprises an inertia block slidably mounted in tubular guide means and sensitive to acceleration and deceleration of the vehicle in two opposite predetermined directions relative to the axis of the vehicle, the inertia block being normally biased by two springs oppositely acting on said block to prevent a striker from moving into a striking position until inertial forces in one or the other of said directions are developed sufficiently to move the inertia block, against the action of said springs, a sufficient distance to release the striker for operating a utilization device.

15 Claims, 11 Drawing Figures

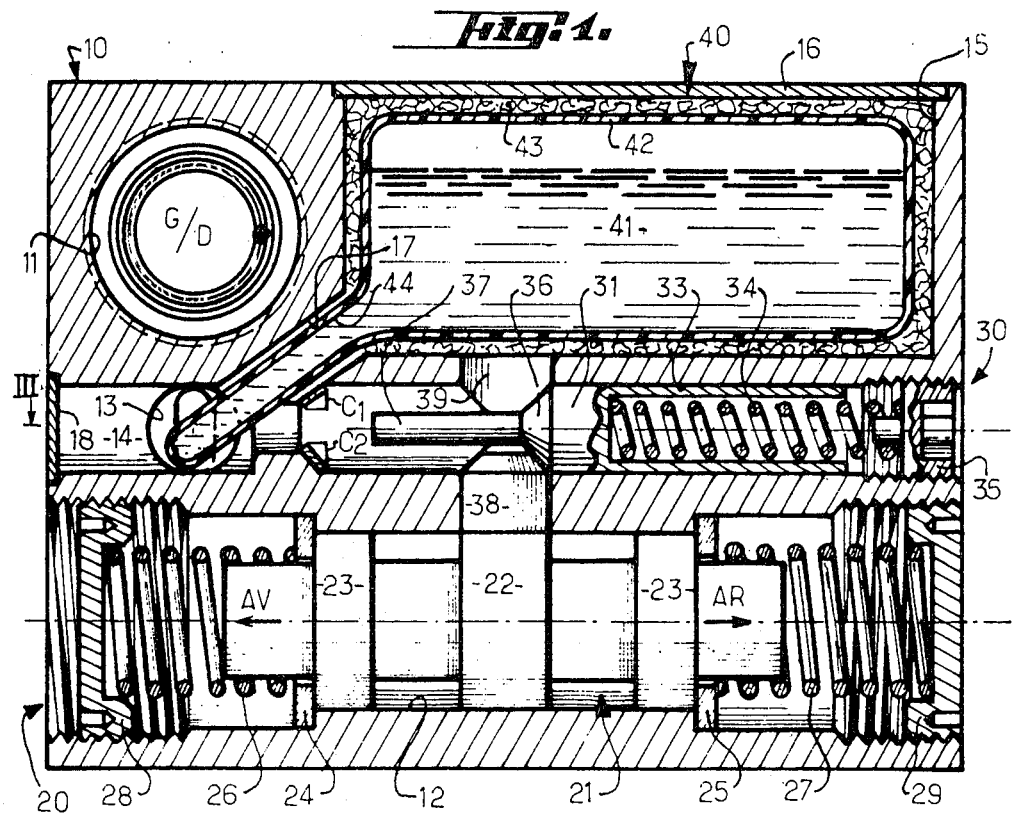
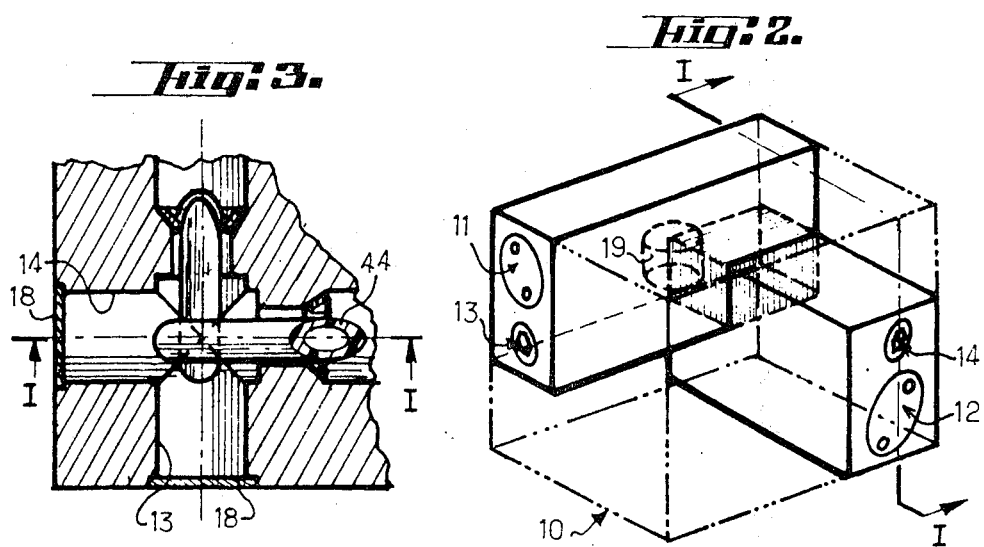

DEVICE FOR AUTOMATIC SIGNALLING OF AN AUTOMOTIVE VEHICLE DAMAGED BY COLLISION

REFERENCE TO PRIOR APPLICATION

The present application is a division of our earlier application Ser. No. 407,445 filed Oct. 18, 1973.

The invention relates generally to the prevention of road accidents and concerns more particularly an automatic signalling device intended to be used on an automotive vehicle in order to signal its position should it happen to be immobilized as a result of a serious collision, more particularly, but not exclusively, with a view to signalling its presence to other road-users so as to avoid any chain telescoping.

Quite numerous devices have been proposed up to the present to signal the presence of a damaged vehicle to other road-users and even to aid police services. The said devices, the usefulness of which appears to be incontestable for road safety, have not been used on a large scale up to the present, and this for the following reasons.

In the first place, such a device must necessarily have small overall dimensions and a simple, sturdy and inexpensive structure, since it is intended to be mounted on a great number of vehicles of quite various types. Moreover, such a device must be capable of remaining inert during a very long time, i.e. for months or years, and, nevertheless, of working instantaneously and without fail in case of an accident; as a corollary it must be possible to check the device at any moment to ensure that it is in good working order. Furthermore, a device of the type concerned must be so constructed as to be incapable of operating untimely in other circumstances than those in which it is intended to start operating, and, on the contrary, it must be adapted to operate in an entirely independent manner in such circumstances, without the intervention of the driver or the passengers of the vehicle, who may then not be in a state allowing them to act, and without having to make use of the power sources or other elements incorporated in the vehicle, which may then be unfit for operation. Lastly, the said device must be capable of taking into account the specific circumstances of the accident having started its operation and must more particularly have different sensitivities to front, rear and lateral impacts.

The invention has precisely for its object to provide a device of the type concerned, capable in particular of meeting all the above-mentioned criteria.

To this end, the invention essentially concerns an inertial sensor device for automatically operating signalling means in an automotive vehicle for providing distress signals to other motorists and comprising at least an inertial pick-up having:

tubular guide means having a linear axis.

an inertia block slidably mounted within said tubular guide means for sliding movement therein only along said axis in the two opposite directions thereof;

two spring means oppositely acting on the inertia block along said axis, each for normally urging said block in either one of said directions, respectively, said two spring means normally locking said inertia block in a predetermined position in said guide means but permitting a small displacement of said inertia block in either one of said direction when said inertia block is subjected to inertial forces exceeding respective first threshold values, possibly different according to one or the other direction;

a spring urged striker operatively related to said inertia block for operation thereby as a function of movement of said inertia block and having a locked untripped position and a released tripped position in which said signalling means are operated;

release means on said striker and on said inertia block for releasing said striker for movement to its tripped position upon a predetermined displacement of said inertia block, in either one of said directions, occasionned by exposure of said inertia block to inertial forces exceeding respective second threshold values possibly different according to one or the other directions, which are greater than the corresponding said first values.

Thus, the inertia block of the inertial pick-up remains motionless under the normal running conditions of the vehicle, thus of course eliminating any risk of premature wear of the device. On the contrary, the said inertia block may be slightly displaced under extreme running conditions, such as an emergency braking, a slewing round, an impingement or any other impact of moderate intensity, thus avoiding any jamming of the said inertia block as a result of a seizing of surfaces having remained in mutual contact for a long time. Moreover, the two operating thresholds thus introduced enable the device to be adjusted in order that it may act only in case of a serious collision necessarily resulting in an immobilization of the vehicle. On the other hand, the use of a striker adapted to be tripped by the inertial pick-up ensures an actuating effect which is independent of the circumstances of the collision and, therefore, capable of reliably starting the signalling means. Whatever the character of the latter, it continues by itself after it is started, whatever the consequences of the collision, and can be detected only by the other road-users capable of being endangered by the presence of the damaged vehicle or of immediately going to its occupants' aid or at least causing the appropriate public services to intervene.

The signalling means may comprise at least one fluid tight enclosure including a breakable or deformable portion located in the path of the said striker and in which is enclosed a product, the freeing or the displacement of which starts the warning. The said product may be simply freed into the atmosphere to create a cloud of smoke and/or a gleam visible by night as well as in daylight, even in the presence of fog. The said product may also be a fluid, the displacement of which ensures the feeding of a light, sound and/or Hertzian wave transmitter by an independent source of electric power; in the latter case, the said source may be constituted by either at least one electric supply cell of the primable type, the aforesaid enclosure of which contains the electrolyte or another constituent agent, or an electric supply cell of the storable type capable of being connected to the said transmitter through a contact closed by mercury or like conductive liquid contained in the said enclosure, or, more simply, by the striker itself.

According to a preferred form of embodiment of the inertial sensor according to the invention, the said inertia block is normally immobilized between two shoulders of a bore by two double-thrust rings acted upon in mutually opposite directions by respective return springs, the said inertia block being provided, on either side of a central bearing collar by which is normally immobilized a member for locking said striker, with two grooves permitting the release of the said member.

In order to be capable of acting in response to a collision in any direction with respect to the initial direction of the vehicle, the device may advantageously comprise either a single inertial pick-up, the inertia block of which may be displaced in both directions along an axis forming a pre-determined angle to the longitudinal axis of the vehicle, or two inertial pick-ups wherein the respective inertia blocks may move in both directions in parallel and perpendicular relationship, respectively, to the longitudinal axis of the vehicle.

It will be observed that the starting of the device according to the invention is entirely automatic and takes place only as a result of a violent impact. It is however interesting to be able to control the said independent means manually in case of a forced immobilization of the vehicle at a dangerous location (road-bend exit, hill top), not as a result of an impact. Consequently, the device according to the invention maybe easily completed by manually controllable means for operating said signalling means, the necessary electric power being supplied by the battery of the vehicle. In this case the said signalling means may be advantageously constituted by a wave transmitter.

According to still another form of embodiment, the device according to the invention comprises two intercrossed inertial pick-ups, the inertia blocks of which are adpated to be displaced in two mutually opposite directions, in parallel and perpendicular relationship, respectively, to the longitudinal axis of the vehicle, each of the said inertia blocks being provided with a dog, catch or like means which locks a striker acted upon by a loaded spring, the said strikers being so arranged as to be displaced in one and the same plane and to strike the said independent warning means at the point of intercrossing of the paths of the two strikers.

Other features and advantages of the invention will appear more clearly from the following detailed description of several examples of embodiment diagrammatically illustrated in the appended drawings wherein:

FIG. 1 is a sectional view of an inertial sensor device according to the invention;

FIG. 2 is a perspective sketch view showing the relative arrangement of the various elements of the device of FIG. 1;

FIG. 3 is a partially sectional view illustrating a detail of embodiment of the device of FIG. 3;

Figure 5:
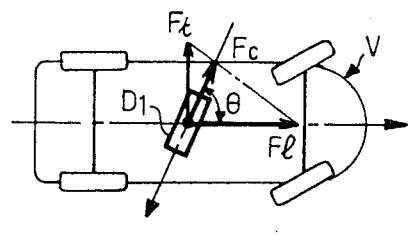
FIGS. 4 and 5 illustrate diagrammatically two possible methods of installing devices according to the invention on a vehicle.

FIGS. 1 to 3 show a multidirectional inertial sensor device according to the invention. This device is essentially constituted by a generally cube-shaped unit 10 made for instance from a light alloy insensitive to corrosion or from an undeformable synthetic material having little sensitivity to heat. The unit 10 is traversed, on the one hand, by two orthogonal bores 11, 12 extending in proximity to two non-concurrent edges and, on the other hand, by two perpendicular bores 13, 14, respectively extending in parallel relationship to the bores 11, 12 and smaller in diameter than the latter, located in the medial plane of the unit 10 parallel with its said edges. Within the remaining volume of the unit 10 are also provided cavities such as 15, each of which is closed by a cover 16 and at least one of which is connected by a passage such as 17 to the intersection of the bores 13, 14, the mutually adjacent openings of which are respectively closed by caps 18. In each bore 11, 12 is arranged an inertial pick-up which is sensitive to the components of the inertia forces in one direction or the other along the axis of the bore considered. In the smaller diameter bores 13, 14 are arranged two strikers, each of which is locked by a releasing mechanism coupled to the parallel inertial pick-up. Lastly, in the cavity such as 15 are arranged means such as smoke-producing fluid reserves, primable or storable electric-supply cells and electric or electronic circuits constituting the signalling means incorporated cube-shaped unit 10. The perspective sketch in FIG. 2 clearly shows that the orthogonal arrangement of the pick-up-and-striker couples located in the bores 11, 13 and 12, 14 leaves a large available space for the arrangement of the signalling means and enables the two strikers to act independently or simultaneously upon elements located in the shaded region of the sketch, so that the device according to the invention is capable of ensuring one and the same result whatever the direction with respect to the vehicle, of the impact having initially started the said device. FIG. 2 also shows that the unit 10 is advantageously provided with incorporated fixing means, advantageously constituted by a single pin, stud or the like 19, so that the deformations of the vehicle caused by the collision cannot be transmitted to the device of the invention. The said means of fixing at a single point are advantageously so arranged as to ensure a fixed orientation of the device with respect to the vehicle.

The inertial pick-up 20 arranged within the bore 12 comprises essentially an inertia block 21 constituted by a body of revolution, which is advantageously made from a metal or heavy alloy having electrochemical properties and frictional qualities compatible with the material constituting the unit 10. The inertia block 21, mounted with an easy fit in the central portion of smaller diameter of the bore 12, is provided with a central bearing collar 22 and two end bearing collars 23. The external lateral faces of the said end bearing collars are respectively in contact with rings 24, 25 which are maintained applied against the shoulders limiting the central portion of the bore 12 by respective springs 26, 27, each of which bears upon a plug 28, 29 screwed into the corresponding opening of the bore 12. The pick-up thus constituted can be manufactured and mounted quite readily since it comprises only bores and bodies of revolution which can readily be machined with accuracy, threads which can be conveniently obtained and springs capable of being independently sampled. Moreover, the structure of this inertial pick-up imparts to it, from the functional point of view, obvious advantages such as a perfect guiding of the inertia block, its positive immobilization between the double-thrust rings 24, 25 as long as the inertia forces cannot overcome the resistance of the springs 26, 27, the easiness and independence of the adjustment of the initial return force of the said springs, the involving of only one of them depending upon the direction of displacement of the inertia block, and the rapid increase of the return force of the spring concerned during such a displacement. Moreover, the structure of the said pick-up enables it, if desired, to be filled at least partially with oil, grease or other suitable fluid for either simple lubrification or shock-absorbtion purposes, an axial channel being in this case provided through the inertia block in order to permit free displacement of the said fluid.

The striker 30 located in the bore 14 and associated with inertial pick-up 20 is simply constituted by a cylindrical body 31, one tubular end 33 of which contains a loading spring 34 bearing upon a plug 35 screwed into the corresponding opening of the bore 14, and the opposite end of which forms a taper portion 36 followed by a rod 37. The striker 30 is normally immobilized in the position shown, wherein the spring 34 is strongly loaded, by a locking member 38 constituted by a simple cylindrical member placed with an easy fit in a hole 39 pierced from the bottom of the cavity 15 down to the bore 12, the said member having, on the one hand, a plane end applied against the central bearing collar 22 of the inertia block 21 of the inertial pick-up 20, and, on the other hand, a taper end applied against the taper portion 36 of the body 31 of the striker 30. As a result of this sturdy and simple arrangement the spring 34 of the striker tends to repel the locking member 38 into the bore 12 and the said locking member is immobilized positively by the inertia block 21 as long as the latter is not moved sufficiently to allow one of its grooves separating its central bearing collar 22 from its end collars 23 to be located under the locking member 38 to permit a backward motion of the latter and, therefore, the freeing of the striker.

The cavity 15 contains a smoke-producing device 40 simply constituted by a smoke-producing fluid reserve 41 enclosed under pressure in a sealed bulb 42 made from glass or any other inert unbreakable material and isolated from the walls of the cavity 15 and its cover 16 by a padding 43 of, for instance, synthetic foam. The bulb 42 is prolonged by a cannula 44 which passes through the passage 17 and ends at the intersection of the bores 13, 14, i.e. in the path of one and/or the other striker placed in the said bores.

The bore 11 contains, of course, an inertial pick-up whose structure is similar to that of the pick-up 20 just described, whereas the bore 13 contains an associated striker, the structure of which is similar to that of the striker 30. However, there may be a few differences in the designs of the two pick-ups fulfilling distinct functions: thus, if the pick-up 20 is assigned to the detection of front and rear impacts, the former of which create decelerations on the order of at least 20g whereas the latter create accelerations on the order of at least 10g, the spring 26 retaining the inertia block 21 against front impacts must have a return force about twice as much as that of the spring 27. Under such conditions, the inertial pick-up located in the bore 11 and intended to respond to transverse impacts, which create accelerations of smaller amplitude, may comprise an inertia block of greater dimensions and, therefore, greater weight, and/or springs which are weaker but identically calibrated.

The cavities of the body 10, other than the cavity 15 already described, may contain various elements of the signalling means incorporated in the device. Thus and for example, a cavity similar to the cavity 15 may be provided under the bores 11 and 13 to receive a bulb containing a fluid intended to be mixed with the fluid 41 to produce a smoke-producing reaction; in this case, as shown in FIG. 1 and still more clearly in FIG. 3, the cannulas of the two bulbs may be so arranged as to be both located in the path of one and/or the other striker placed in the bores 13 and 14, respectively. On the other hand, other cavities provided in the remaining volume of the unit 10 may contain an electric and/or electronic signalling equipment and a supply source therefor, the operation of which is started under the action of one and/or the other striker, either by closing normally open contacts, or by starting an electrochemical reaction ensuring the supply of electric power to the equipment. In the former case it is sufficient, for example, to arrange on the taper surface provided in each bore 13, 14 to limit the travel of the corresponding striker two contacts C1, C2 which are normally isolated from one another but so arranged as to be interconnected by the body 31 of the striker when they are contacted by a taper portion 36; the two sets of contacts thus arranged in the bores 13, 14, respectively, may be connected in parallel and inserted between the source and the equipment. It is also possible to place at the intersection of the bores 13, 14 a mercury contact which is normally open but so arranged as to be closed by the action of one and/or the other striker. Lastly, the latter may be so arranged as to ensure the operation of a primable electric supply cell connected permanently to the equipment which they are intended to supply. Examples of embodiment of the latter two variants will be described hereafter. The inertial sensor device thus constituted operates as follows.

The device is mounted for example under the platform of the vehicle and preferably substantially at the centre of the latter, in such a manner that the bores 11, 12 extend horizontally in perpendicular relationship. Thereafter, or beforehand, the plugs such as 28, 29 are screwed in such a manner that each of the springs such as 26, 27 exerts on the associated inertia block 21 a return force greater than the maximum value of the component in the direction concerned of the inertia forces to which the said inertia block may be subjected under the normal running conditions, with the exception of, for instance, an emergency braking, a slew-round or an impingement at a low speed with no risk of serious consequences. In practice, the springs 26 and 27 are so adjusted as to exert different return forces capable of being overcome by antagonistic inertia forces in case of a front impact or a rear impact, respectively, whereas the springs (not shown) of the other pick-up within the bore 11 are so adjusted as to exert return forces equal to and smaller than the ones just mentioned and capable of being overcome by antagonistic inertia forces in case of a lateral impact.

The pick-ups thus being loaded, the inertia blocks remain normally immobilized by their respective return springs as long as the vehicle runs under normal conditions, i.e. as long as it is not subjected to any excessive acceleration or deceleration. Under some exceptional running conditions, for example during a very abrupt braking on a dry road with a good adherence, or during a high-speed passage on a sharp road-bend, at least one of the inertia blocks, may be subjected to a force of sufficient intensity to cause it to be displaced slightly against the action of one of its return springs without however freeing any associated striker; such a displacement offers the advantage of avoiding any seizing of the mutually contacting surfaces of the inertia block and the striker, and thus keeping the pick-ups in perfect working order for a long time.

If on the contrary, the vehicle is involved in a serious collision against a stationary obstacle or another road-user, capable of practically certainly entailing the immobilization of the vehicle and even of rendering its driver and its passengers, if any, unable to act, at least one of the inertia blocks, for instance block 21, is displaced sufficiently to free the corresponding striker 30, the locking member 38 falling down in one of the grooves of the inertia block 21 separating its central bearing collar 22 from its end collars 23. The striker thus freed is then violently propelled by its return spring 34 and its displacement can be used to start the operation of the signalling means, by breaking the cannula 44 and/or closing contacts C1, C2.

The essential function of said signalling means is to draw the attention of the drivers of other vehicles in order that they may take any necessary measures to ensure their own safety. To this end and in practice, it is sufficient that the warning be detectable within a radius of a few hectometers at most, but greater than the greatest braking distance under the worst running conditions, and that it persists during at least several minutes, for example 20 minutes, in order to remain useful even on a small-traffic road at hours when the latter is least frequented. In order to meet these conditions, an emission of a simple cloud of smoke-producing gas may suffice provided the said cloud includes reflecting or fluorescent particles enabling it to be perceived by night as well as in fog. Optical or acoustical transmitters may also be used, provided the former are capable of operating usefully whatever the position of the vehicle subsequent to the accident and are in no case likely to aggravate the latter, which means that any combustion of, for example, bengal lights, is excluded, and that the latter are sufficiently powerful to be perceived with certainty by the other road-users at a sufficient distance; in both cases, it will therefore be necessary to provide the device with means for the storage of important power, thus inconsiderately increasing the cost and considerably reducing the reliability of the device in the long run. For these reasons, in addition to the above-mentioned smoke-producing gases, the signalling means associated with the device according to the invention are advantageously constituted by a small-range, therefore low-power, radio electric transmitter supplied from an independent source of electric power; consequently, the other vehicles must, of course, be provided with an appropriate receiver which may be of very simple design; furthermore, such receivers may be incorporated in milestones or survey-poles spaced along roads, so as to ensure automatic warning of the public aid or police services by enabling them to locate the damaged vehicle. It should be noted that such a radio electric transmitter must necessarily have a very small range and, therefore, a very low power, thus facilitating its supply from an independent source and enabling it to be used without any administrative licence.

Figure 4:
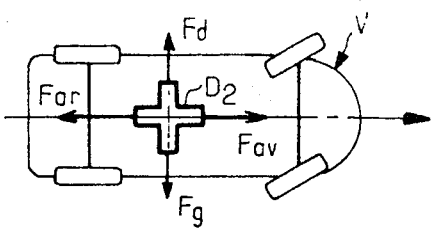

FIGS. 4 and 5 diagrammatically illustrate two examples of installation of a device according to the invention on an automotive vehicle.

In both examples, the device D1, D2 is permanently secured under the floor of the vehicle V, in proximity to its centre of gravity or gyration, i.e. at the external point of the vehicle which is best protected against impacts, and at the point where the least interfering accelerations are exerted under the normal running conditions of the vehicle. In view of such an installation, the device is advantageously coated with an inert material, such as synthetic resin, ensuring its protection against atmospheric influences, fine gravel projections and, should be the case arise, the radiation from the exhaust pipe. The device is preferably secured at a single point, as already mentioned, so as to prevent any influence of the deformations to which the vehicle floor may be subjected during a collision, and in such a manner as to be substantially parallel with the vehicle rolling plane and, therefore, practically insensitive to the vertical accelerations produced during passage on, for instance, a pothole or a cross-drain. The device is also so secured as to be correctly oriented with respect to the vehicle: thus, the device D2, which comprises two intercrossed inertial pick-ups, as described above, is so oriented as to enable one of the said pick-ups to respond to the inertia forces Fav, Far directed respectively forwardly and rearwardly of the vehicle V and to enable the other pick-up to respond to the transverse forces Fg, Fd directed respectively towards the left and the right of the vehicle. On the other hand, the device D1 comprises only a single inertial pick-up which is inclined to the longitudinal axis of the vehicle V at an angle $\theta$ so selected that the ratio between the longitudinal inertia force F1 and the transverse inertia force Ft producing one and the same force Fc along the axis of the pick-up correspond to the ratio of the longitudinal and transverse accelerations considered as connected with the immobilization of the vehicle in case of a collision. Of course, other ways of installing the device according to the invention may be contemplated, for instance at the bottom of the passenger compartment, in proximity to the quarter-light.

Figure 6:
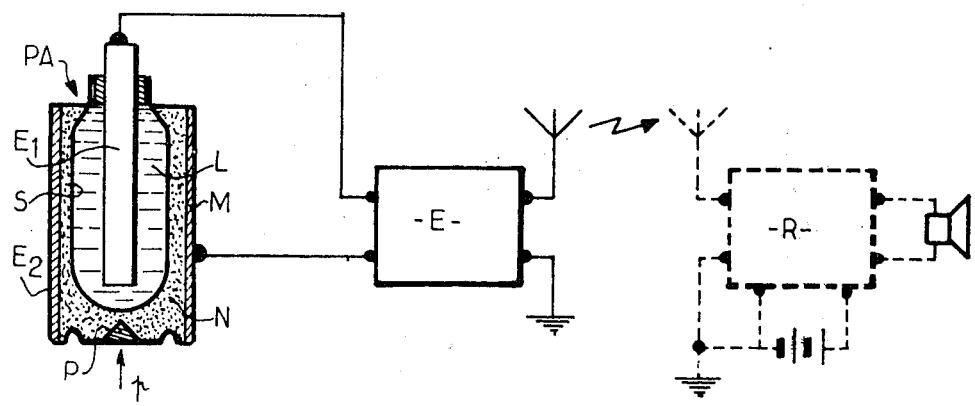
FIGS. 6 and 7 illustrate diagrammatically two possible forms of embodiment of an electric equipment fit for use with a device according to the invention.

FIG. 6 diagrammatically illustrates the radio electric signalling means capable of being associated with a device according to the invention.

Signalling means comprise essentially a transmitter E which, in case of a serious collision, provides a warning signal intended for the receivers R mounted on the other vehicles. The starting of the transmitter E is ensured by way of percussion of a primable electric-supply cell PA to which it is connected permanently. This cell, shown quite diagrammatically, comprises a central electrode E1 immersed in an electrolyte liquid L enclosed in a separator S of glass or any other electrically insulating material capable of breaking under the action of an impact. The separator S is surrounded by a pulverulent or porous neutral material N filling the internal space of a sleeve of active material M, the whole assembly being enclosed in a metal casing E2 constituting the second electrode of the primable electric-supply cell PA and the deformable bottom of which carries an internal point P intended to break the separator S under the action of a percussion p. Thus, it is sufficient to place such a primable cell PA in the path of the striker of a device according to the invention to ensure the feeding and, therefore, the operation of the transmitter E. The latter then supplies a very-low power warning signal intended for the other vehicles.

Figure 7:
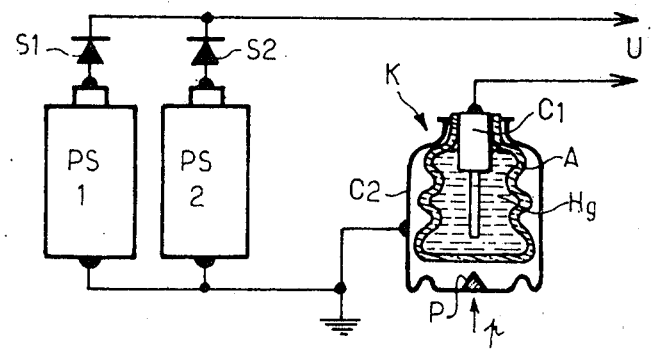
Figure 8:
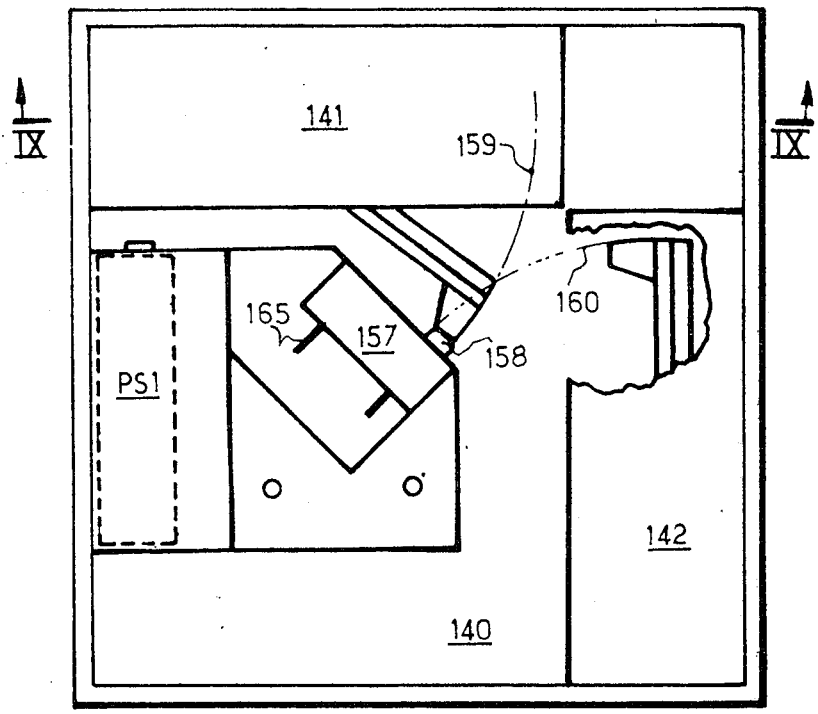
FIG. 8 is a top, partially broken-away view of another example of embodiment of a device according to the invention.
Figure 9:
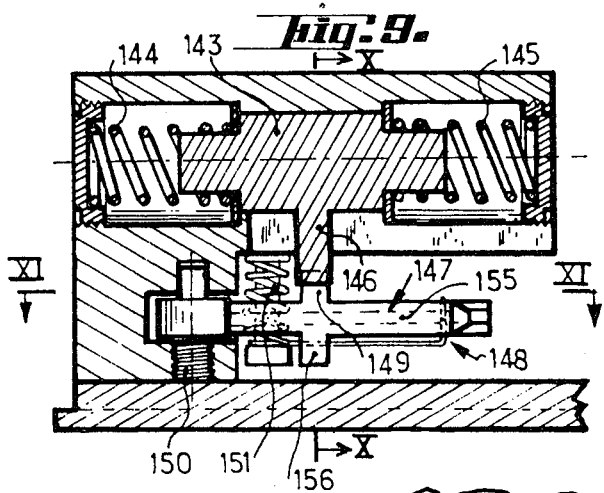
FIG. 9 is a sectional view upon the line IX—IX of FIG. 8.
Figure 10:
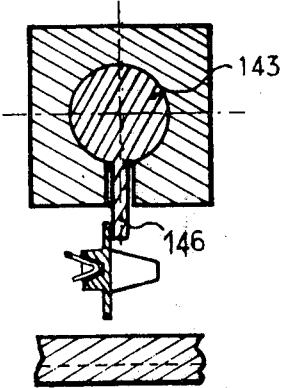
FIG. 10 is a sectional view upon the line X—X of FIG. 9.
Figure 11:
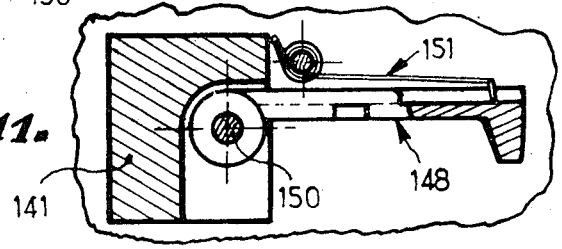
FIG. 11 is a sectional, partially broken-away view upon the line XI—XI of FIG. 9.

FIG. 7 diagrammatically illustrates another system for the feeding of the electric signalling means intended to be associated with a device according to the invention.

Two storable electric-supply cells PS1, PS2 are coupled in parallel through the medium of diodes or other electric valves S1, S2 of one and the same polarity, the whole assembly being coupled to the utilizer U through the medium of a normally open contact K capable of being closed in case of a collision. The contact K is essentially constituted by a mercury reserve Hg enclosed in a bulb A of glass or other breakable material, the neck of which ensures the electric insulation and sealing of an axial contact C1 constituted by a simple metal rod, and a second contact C2 constituted by a metal casing, the deformable bottom of which carries an internal point P intended to break the bulb A under the action of a percussion p. The volume of the mercury reserve Hg and that of the casing C2 are so proportioned as to enable the mercury freed by the breakage of the bulb A to electrically interconnect the axial rod C1 and the metal casing C2 whatever the position of the contact K.

FIGS. 8, 9, 10 and 11 illustrate another form of embodiment of an automatic tripping device according to the invention. The said device is constituted by a frame 140 on which are mounted two said inertial pick-ups 141 and 142 arranged in one and the same plane in perpendicular relationship to one another. Each inertial pick-up comprises an inertia block 143 capable of being displaced in two opposite directions and placed between two springs 144 and 145. The said inertia block is provided with a dog, catch or the like 146, which locks against rotation the arm 147 of a striker 148 located below the corresponding inertia block and provided with a dog 149 co-operating with the dog 146. The said striker is adapted to turn about an axis 150 and is acted upon by a loaded spring 151; the groove 155 advantageously provided over the whole length of the striker arm ensures a more reliable contact with the spring 151. The protuberance 156 of the striker is of no physical utility and simply permits the interchangeability of the strikers within the pick-up units 141 and 142. A contact-maker 157, for instance of the microswitch type, is so mounted on the frame that the key 158 of the said contact-maker is located at the intersection of the paths 159 and 160 of the ends of the two strikers.

The device operates as follows. Under normal running conditions, the inertia blocks are locked owing to the force resulting from the acceleration of the vehicle and applied to the said inertia blocks being smaller than the initial force of the springs; under abnormal running conditions, the inertia blocks may move without however freeing the striker. Should an impact occur, at least one of the inertia blocks, depending upon the direction of the said impact, is displaced over a distance allowing the corresponding striker to be freed from dog 146 and its end to switch on the contact-maker 157.

Of course, the invention is by no means limited to the forms of embodiment described and illustrated, which have been given by way of example only. In particular, it comprises all the means constituting technical equivalents to the means described as well as their combinations, should the latter be carried out according to the spirit of the invention.

What is claimed is:

1. An inertial sensor device for automatically activating at least one type of signalling means in an automative vehicle, having a longitudinal axis, for providing distress signals to other motorists and comprising at least two inertial pick-ups each of which inertial pick-ups includes tubular guide means having a bore extending along a linear axis thereof and a slot therein, one of said guide means being oriented in parallel relationship to the longitudinal axis of the vehicle and another guide means being oriented transversely of said longitudinal axis; an inertia block slidably mounted within the bore of each said tubular guide means for sliding movement therein in two opposite directions thereof, each said inertia block including release means comprising a first stop pin forming part of said inertia block and extending radially outwardly of its guide means through the slot thereof; two spring means oppositely acting on each inertia block along the linear axis of its associated guide means, each said spring means normally urging said block in one of said directions, said two springs normally locking their associated inertia block in a predetermined position in its guide means but permitting a small displacement thereof in either one of said directions when the inertia block is subjected to inertial forces exceeding predetermined first threshold values; a spring-urged striker operatively related to each inertia block for operation thereby as a function of movement of its inertia block, each striker having a locked untripped position and a released tripped position in which the signalling means are activated, each striker comprising a pivotably mounted arm having a release means comprising second stop pin normally engaged by said first stop pin when same extends through said slot to retain the striker in its untripped position; the release means on said striker and on its associated inertia block being cooperable for releasing said striker for movement to its tripped position upon a predetermined displacement of said inertia block, in either one of said directions, occasioned by exposure of said inertia block to inertial forces exceeding predetermined second threshold values which are greater than the corresponding said first values; said two inertial pick-ups having their strikers mounted for movement, when released by a respective first stop pin, in the same plane and in intersecting paths; and a single switch the actuating means of which is located in said plane of movement of said strikers substantially at the point of intersection of said intersecting paths.

2. A device according to claim 1, wherein the bore of each said guide means is provided with a reduced diameter portion defining two shoulders, a pair of thrust rings being positioned within said bore in engagement with the respective shoulders, each said spring means acting on one of said thrust rings so that the inertia block within the bore is locked in said reduced diameter bore portion under the conjoint action of said thrust rings and the two spring means respectively acting thereon.

3. A device according to claim 1, comprising two horizontally extending inertial pick-ups, one having its guide means oriented in parallel relationship to the longitudinal axis of said vehicle and the other having its guide means oriented perpendicularly to said axis.

4. A device according to claim 1, wherein the said predetermined first threshold values for the block in the guide means parallel to the longitudinal axis of the vehicle are greater than the corresponding first threshold values for the inertia block in the guide means transverse to said longitudinal axis of the vehicle.

5. An inertial sensor device for automatically activating at least one type of signalling means in an automative vehicle, having a longitudinal axis, for providing distress signals to other motorists and comprising at least two inertial pick-ups each of which inertial pick-ups includes tubular guide means having a bore extending along a linear axis thereof, one of said guide means being oriented in parallel relationship to the longitudinal axis of the vehicle and another guide means being oriented transversely of said longitudinal axis; an inertia block slidably mounted within the bore of each said tubular guide means for sliding movement therein in two opposite directions thereof; two spring means oppositely acting respectively on each inertia block along the linear axis of its associated guide means, each said spring means normally urging said block in a different one of said directions, said two springs normally locking their associated inertia block in a predetermined position in its guide means but permitting a small displacement thereof in either one of said directions when the inertia block is subjected to inertial forces exceeding predetermined first threshold values; a spring urged striker operatively related to each inertia block for operation thereby as a function of movement of its inertia block, each striker having a locked untripped position and a released tripped position in which at least one of the signalling means is activated; release means associated with the respective inertia blocks and strikers adapted to release the relevant striker for movement to its tripped position upon a predetermined displacement of the corresponding inertia block, in either one of said directions, occasioned by exposure of said inertia block to inertial forces exceeding predetermined second threshold values which are greater than the corresponding said first values; said two inertial pick-ups having their strikers mounted for movement, when released by said release means, in the same plane and in intersecting paths; and a single actuating means located in said plane of movement of said strikers substantially at the point of intersection of said intersecting paths.

6. A device according to claim 5, wherein said inertia block has a central bearing collar and end collars spaced therefrom, said collars being of a size to define therebetween a pair of grooves, said release means comprising a member which is normally immobilized between said striker and said central collar to maintain said striker in its untripped position, said member releasing said striker when moved into one of said grooves upon displacement of said inertia block by said inertial force above one aforesaid second threshold value.

7. A device according to claim 5, wherein the bore of each said guide means is provided with a reduced diameter portion defining two shoulders, a pair of thrust rings being positioned within said bore in engagement with the respective shoulders, each said spring means acting on one of said thrust rings so that the inertia block within the bore is locked in said reduced diameter bore portion under the conjoint action of said thrust rings and the two spring means respectively acting thereon.

8. A device according to claim 5, wherein the said predetermined first threshold values for the block in the guide means parallel to the longitudinal axis of the vehicle are greater than the corresponding first threshold values for the inertia block in the guide means transverse to said longitudinal axis of the vehicle.

9. A device according to claim 8, comprising a fluid tight chamber having a deformable portion located in the path of said striker, said fluid tight chamber containing a fluid product and said fluid product being released from said chamber by the action of said striker.

10. A device according to claim 9, in combination with signalling means including a Hertzian wave transmitter, said signalling means including a normally open contact and at least one electric supply cell of the lead storage type connected to said transmitter through said normally open contact, said fluid product being a conductive liquid which, when released under action of said striker effectively closes said contact.

11. A device according to claim 5, comprising two horizontally extending inertial pick-ups, one having its guide means oriented in parallel relationship to the longitudinal axis of said vehicle and the other having its guide means oriented perpendicularly to said axis.

12. A device according to claim 11, wherein said signalling means includes a fluid tight chamber having a deformable portion located in the path of said strikers, said fluid tight chamber containing a fluid product and said product being releasable from said chamber by the action of at least one of said strikers.

13. A device according to claim 5, wherein said signalling means includes a fluid tight chamber having a deformable portion located in the path of said strikers, said fluid tight chamber containing a fluid product and said product being releasable from said chamber by the action of at least one of said strikers.

14. A device according to claim 13 in combination with signalling means including a Hertzian wave transmitter said signalling means including at least one electric supply cell of the primable type permanently connected to said transmitter, said chamber forming part of said electric supply cell and containing an electrolyte for said primable type cell.

15. A device according to claim 13, in combination with signalling means including a Hertzian wave transmitter, said signalling means including a normally open contact and at least one electric supply cell of the lead storage type connected to said transmitter through said normally open contact, said fluid product being a conductive liquid which, when released under action of said striker, effectively closes, said contact.

* * * * *